US011945207B2

(12) United States Patent
Anderson et al.

(10) Patent No.: US 11,945,207 B2
(45) Date of Patent: Apr. 2, 2024

(54) WEB SHIFT COMPENSATION

(71) Applicant: Hewlett-Packard Development Company, L.P., Spring, TX (US)

(72) Inventors: Ronald R. Anderson, Corvallis, OR (US); Joseph Santich, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/257,330

(22) PCT Filed: Oct. 29, 2018

(86) PCT No.: PCT/US2018/058008
§ 371 (c)(1),
(2) Date: Dec. 31, 2020

(87) PCT Pub. No.: WO2020/091731
PCT Pub. Date: May 7, 2020

(65) Prior Publication Data
US 2021/0276319 A1 Sep. 9, 2021

(51) Int. Cl.
*B41F 13/02* (2006.01)
*B65H 23/035* (2006.01)

(52) U.S. Cl.
CPC ......... *B41F 13/025* (2013.01); *B65H 23/035* (2013.01); *B65H 2801/21* (2013.01)

(58) Field of Classification Search
CPC .... B41F 13/025; B65H 23/035; B65H 23/038
USPC ........................................................ 101/228
See application file for complete search history.

(56) References Cited

U.S. PATENT DOCUMENTS 4,385,716 A * 5/1983 De Roeck ............ B65H 23/038 242/615.1
4,554,714 A * 11/1985 Cho .................. B65H 23/0256 26/105
5,100,117 A 3/1992 Hajek et al.
(Continued)

FOREIGN PATENT DOCUMENTS

CN 1076666 A 9/1993
CN 1683211 A 10/2005
(Continued)

OTHER PUBLICATIONS

Kohler Coating, “180° Air Floatation Turnbar/Web Guide Systems”, Retrieved from the Internet on Jul. 10, 2018, Available at: http://www.kohlercoating.com/docs/180TurnBar.pdf.

*Primary Examiner* — Jennifer Bahls
*Assistant Examiner* — Quang X Nguyen

(57) ABSTRACT

According to examples, an apparatus may include a first feed element and a second feed element, in which a web is to be fed to the first feed element and from the first feed element to the second feed element. The apparatus may also include a controller that may determine whether the web exiting the second feed element is shifted from an intended position and based on a determination that the web is shifted from the intended position, cause the first feed element to be moved laterally a first distance and the second feed element to be moved laterally a second distance to compensate for the shift in the web exiting the second feed element.

12 Claims, 5 Drawing Sheets

(56) References Cited

U.S. PATENT DOCUMENTS

| | | | | |
|---|---|---|---|---|
| 5,108,022 | A * | 4/1992 | Birkmair | B65H 23/32 226/15 |
| 5,357,859 | A | 10/1994 | Eckert | |
| 5,528,987 | A | 6/1996 | Andersson et al. | |
| 5,540,146 | A * | 7/1996 | Lapp | B65H 23/0212 101/152 |
| 6,047,922 | A | 4/2000 | Michalik | |
| 6,050,188 | A | 4/2000 | Bolza-Schunemann | |
| 6,325,266 | B1 * | 12/2001 | Suzuki | B41F 13/03 101/223 |
| 6,705,220 | B2 | 3/2004 | Boucher | |
| 6,902,135 | B2 | 6/2005 | Boucher | |
| 8,684,298 | B2 | 4/2014 | Opfer et al. | |
| 2008/0257183 | A1 | 10/2008 | Yamaguchi | |
| 2011/0064507 | A1 * | 3/2011 | McLaughlin | B41J 15/165 400/612 |
| 2016/0271823 | A1 | 9/2016 | Slovut et al. | |

FOREIGN PATENT DOCUMENTS

| | | | |
|---|---|---|---|
| CN | 102029809 | A | 4/2011 |
| CN | 103753974 | A | 4/2014 |
| EP | 1461486 | A1 | 9/2004 |
| GB | 2171084 | A | 8/1986 |
| WO | 03/52193 | A1 | 6/2003 |
| WO | WO-2008139760 | A1 | 11/2008 |
| WO | 2011/099562 | A1 | 8/2011 |
| WO | 2018/051805 | A1 | 3/2018 |

* cited by examiner

WEB SHIFT COMPENSATION

BACKGROUND

Web presses may be rotary printing presses that print on a continuous roll of paper or other material called a web, rather than on individual sheets of cut material. Web material may be less expensive than cut material, and web presses may be suited to any type of large-volume and/or high-speed printing. Web presses may most commonly be used to print newspapers, magazines, and catalogs. Unlike sheet-fed presses, web presses may also print on plastic or foil surfaces for package and label printing. Many common web press print jobs are executed by passing a web between multiple printers. In one such print job, in which two sides of a web are printed, a first engine prints on one side of the web, and a second print engine prints on the other side of the web. Another such print job includes printing on one side of the web, but the first print engine executes only a portion of the print (such as black and white text) and the second print engine executes the remaining portion of the print (such as color highlights).

BRIEF DESCRIPTION OF THE DRAWINGS

Features of the present disclosure are illustrated by way of example and not limited in the following figure(s), in which like numerals indicate like elements, in which.

DETAILED DESCRIPTION

During a web feed operation, for instance in a web press, the web may shift along a direction (second direction) that is perpendicular to the direction at which the web is fed. That is, the web may shift along the second direction a distance away from an intended position after the web has been fed across a first feed element and a second feed element, in which the web is fed from the first feed element to the second feed element. Disclosed herein are apparatuses that may move the first feed element and the second feed element in a linear (or equivalently, a lateral) direction to compensate for the shift in the web, while maintaining a tension stability on the web. That is, the apparatuses disclosed herein may correct for the shift in the web while reducing and/or minimizing a change in total web length, which may preserve a web distance between web handling equipment ahead of and following the apparatuses disclosed herein. This preservation of the web length may benefit tension stability in the web as may normally be caused through shift compensation. By reducing and/or minimizing the change in tension in the web, the speed at which the web may be fed may be stable and thus, the web may be printed upon accurately.

According to examples, the apparatuses, and more particularly, controllers of the apparatuses, may cause the second feed element to be moved a lateral distance that differs from the lateral distance that the first feed element is moved. Particularly, for instance, the controllers may cause the second feed element and the first feed element to be moved concurrently with respect to each other in a manner that prevents or reduces changes in web length through the a web turning and aligning assembly, which may also be referenced herein as a feed assembly. The reduction in the web length change may also prevent or reduce changes to the tension of the web as the web is fed across the first feed element and the second feed element. By way of example, the first feed element may be moved half the distance that the second feed element is moved to compensate for the shift in the web. In addition, the first feed element may be moved at a different rate (e.g., speed) that the rate at which the second feed element is moved. For instance, the first feed element may be moved at half the rate at which the second feed element is moved.

Before continuing, it is noted that as used herein, the terms "includes" and "including" mean, but is not limited to, "includes" or "including" and "includes at least" or "including at least." The term "based on" means "based on" and "based at least in part on."

Figure 1:
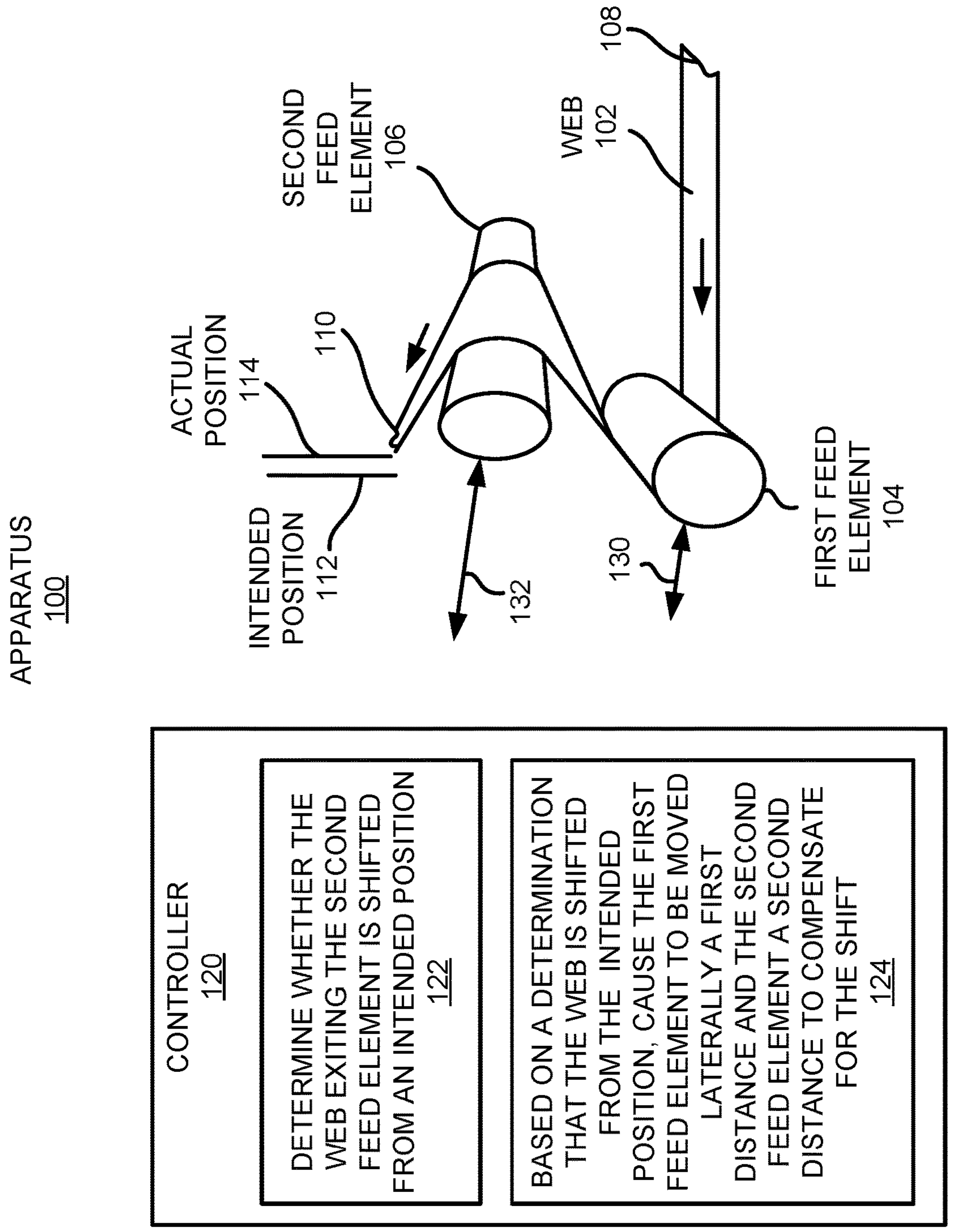
FIG. 1 shows a block diagram of an example apparatus that may compensate for a shift in a position of a web being fed across a first feed element and a second feed element.

With reference to FIG. 1, there is shown a block diagram of an example apparatus 100 that may compensate for a shift in a position of a web 102 being fed across a first feed element 104 and a second feed element 106. It should be understood that the apparatus 100 depicted in FIG. 1 may include additional components and that some of the components described herein may be removed and/or modified without departing from the scope of the apparatus 100 disclosed herein.

Generally speaking, the first feed element 104 and the second feed element 106 in the apparatus 100 may guide the web 102 from a first location 108 to a second location 110, for instance, in a web press. The first feed element 104 and the second feed element 106 may guide the web 102 to direct the web from one print engine (not shown) to another print engine (not shown) or from a print engine back to the print engine. In addition, in some examples, the first feed element 104 and the second feed element 106 may guide the web 102 to flip the web 102 from one side to another as the web 102 is fed across the first feed element 104 and the second feed element 106. In any regard, the second feed element 106 may be angled with respect to the first feed element 104 to cause the web 102 to be turned with respect to the angle at which the web 102 rolls across the first feed element 104. For instance, the second feed element 106 may be at about a 45° angle with respect to the first feed element 104. In other examples, the second feed element 106 may be at a different angle with respect to the first feed element 104 and may be based on a direction at which the web 102 is to be fed from the second feed element 106. In any of these examples, the first feed element 104 and/or the second feed element 106 may be roll feed elements or air feed elements (e.g., feed elements having holes through which pressurized air may be outputted such that the first feed element 104 and/or the second feed element 106 may function as air bearings). In examples, the first feed element 104 may be a roller, a roll bar, an idler, or the like, and the second feed element 106 may be an air bar.

As the web 102 is fed across the first feed element 104 and the second feed element 106 and from the second feed element 106, the web 102 may be shifted in a direction that is perpendicular to the direction in which the web 102 is fed. The shift in the position of the web 102 may affect the print quality on the web. That is, the web 102 may have an intended position 112 at which printing fluid, e.g., ink, may accurately be printed onto the web 102, but the web 102 may be shifted from the intended position 112 to an actual position 114. In instances in which the position of the web 102 is shifted, the printing fluid may not be applied onto intended locations on the web 102 and thus, there may be errors in the locations at which printing fluid is applied onto the web 102.

According to examples, the apparatus 100 may include a controller 120 that may compensate for a shift in a position of the web 102 through being fed across the first feed element 104 and the second feed element 106. The controller 120 may be an integrated circuit, such as an application-specific integrated circuit (ASIC). In these examples, the instructions 122 and 124 may be programmed into the integrated circuit. In other examples, the controller 120 may operate with firmware (i.e., machine-readable instructions) stored in a memory. In these examples, the controller 102 may be a microprocessor, a CPU, or the like. In these examples, the instructions 122 and 124 may be firmware and/or software that the controller 120 may execute as discussed in detail herein.

The controller 120 may compensate for the shift by moving the first feed element 104 and the second feed element 106 in a direction that reduces the distance between the intended position 112 and the actual position 114. Particularly, for instance, the controller 120 may determine (instructions 122) whether the web 102 exiting the second feed element 106 is shifted from the intended position 112. In addition, based on a determination that the web 102 is shifted from the intended position, the controller 120 may cause (instructions 124) the first feed element 104 to be moved laterally a first distance 130 and the second feed element 106 to be moved laterally a second distance 132 to compensate for the shift in the web 102 exiting the second feed element 106. In examples, the controller 120 may cause the first feed element 104 and the second feed element 106 to be moved concurrently with each other and at different rates with respect to each other.

The first feed element 104 may be moved the first distance 130 and concurrently, the second feed element 106 may be moved the second distance 132. The first feed element 104 may be moved to compensate for the shift while also preserving the web 102 length during the web shift compensation. That is, the web 102 may be maintained under tension as the web 102 is fed across the first feed element 104 and the second feed element 106 while maintaining the web 102 length. When one or both the first feed element 104 and the second feed element 106 are moved laterally, the length of the web 102 may be affected. However, by moving the first feed element 104 the first distance 130 and moving the second feed element 106 the second distance 132 as discussed herein, the length of the web 102 may be preserved during and after the movements. In addition, the tension in the web 102 may be preserved or maintained by moving the first feed element 104 at half the rate at which the second feed element 106 is moved.

According to examples, the second distance 132 may be equal to a distance of the shift between the intended position 112 and the actual position 114 of the web 102 exiting the second feed element 106. In these examples, the controller 120 may determine the distance of the shift based upon a difference between a detected position of an edge of the web 102 exiting the second feed element 106 and the intended position 112 and may control the lateral movement of the second feed element 106 to be based on, e.g., equal to, the determined distance of the shift.

According to examples, the first distance 130 may be related to the second distance 132. That is, for instance, the first distance 130 may be a fraction of or may otherwise depend upon the second distance 132. By way of example, the first distance 130 may be half the length of the second distance 132. By moving the first feed element 104 and the second feed element 106 in this manner, web tension stability may be preserved during a web shift compensation operation. In other examples, the dependency between the first distance 130 and the second distance 132 may differ and may be determined through testing of the effects various distances 130, 132 have on the stability of the web 102 tension. For instance, the dependency between the first distance 130 and the second distance 132 may vary depending upon differences in the angles at which the first feed element 104 and the second feed element 106 extend.

Figure 2:
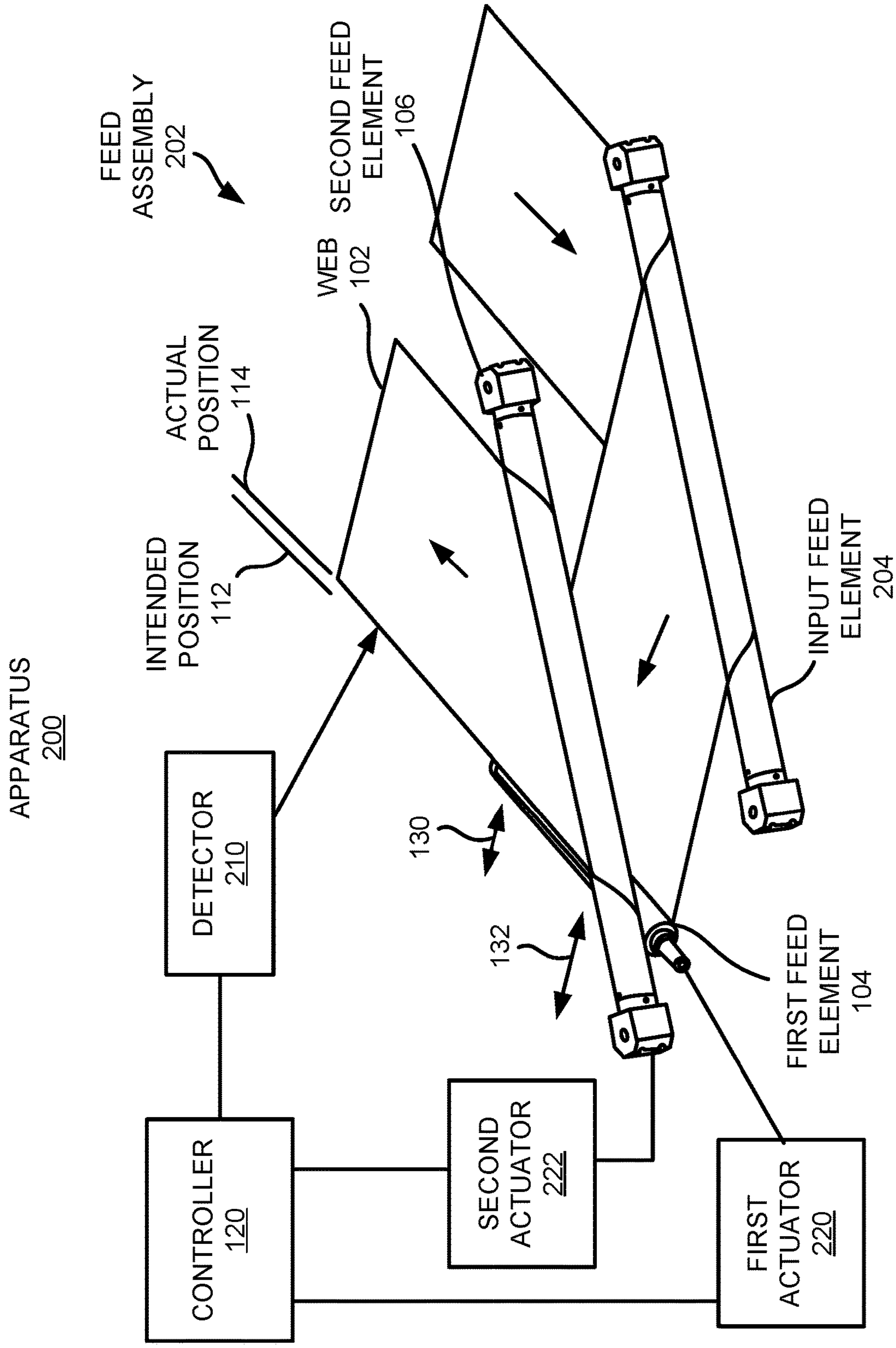
FIG. 2 shows a diagram of an example apparatus that may compensate for a shift in a position of a web being fed across a first feed element and a second feed element.

Reference is now made to FIG. 2, which shows a diagram of an example apparatus 200 that may compensate for a shift in a position of a web 102 being fed across a first feed element 104 and a second feed element 106. It should be understood that the apparatus 200 depicted in FIG. 2 may include additional components and that some of the components described herein may be removed and/or modified without departing from the scope of the apparatus 200 disclosed herein.

As shown in FIG. 2, the apparatus 200 may include a feed assembly 202 that may include the first feed element 104, the second feed element 106, and the controller 120. The apparatus 200 shown in FIG. 2 may thus include many of the same components as those of the apparatus 100 depicted in FIG. 1. As such, the common components are not described again with respect to the apparatus 200 as the descriptions of the common components may also be applicable to the components as depicted in FIG. 2.

The feed assembly 202 may also include an input feed element 204 that may be positioned upstream (in terms of the web feed direction) of the first feed element 104. The input feed element 204 may be an air feed element (e.g., may have holes through which pressurized air may be outputted such that the input feed element 204 may function as an air bearing). In addition, the input feed element 204 may be angled with respect to the first feed element 104 such that the direction at which the web 102 comes into the feed assembly 202 may differ from the direction at which the web 102 exits the feed assembly 202. By way of example, the input feed element 202 may extend along a plane that is perpendicular to the plane along which the second feed element 106 extends. As shown in FIG. 2, the first feed element 104, the second feed element 106, and the input feed element 202 may be positioned and angled such that the web 102 may be outputted in the opposite direction from which the web 102 is inputted into the feed assembly 202. In addition, the feed assembly 202 may cause the web 102 to be flipped over as the web 102 is fed through the feed assembly 202 as also shown in FIG. 2.

The apparatus 200 may also include a detector 210 to detect the position of an edge of the web 102 as the web 102 exits the feed assembly 202 from the second feed element 106. The detector 210 may be any suitable type of web position detector, such as an optical detector, a mechanical detector, or the like. In addition, the detector 210 may communicate the detected web 102 positon (e.g., the actual position 114) to the controller 120. The controller 120 may compare the detected web 102 position with the intended position 112 to determine 122 whether the web 102 has shifted from or is otherwise away from the intended position 112.

The controller 120 may also, based on a determination that the web 102 is shifted from the intended position 112, cause 124 the first feed element 104 to be moved laterally a first distance 130 and the second feed element 106 to be moved laterally a second distance 132 to compensate for the shift in the web 102 exiting the feed assembly 202. As shown, the controller 120 may control a first actuator 220 to laterally move the first feed element 104 the first distance 130 and may control a second actuator 222 to laterally move the second feed element 106 the second distance 132. As discussed herein, the first distance 130 may relate to the second distance 132, e.g., may be half the length of the second distance 132. The controller 120 may also control the first actuator 220 and the second actuator 222 to laterally move the first feed element 104 at a rate that differs from the rate at which the second feed element 106 is moved.

According to examples, the ends of the first feed element 104 and the second feed element 106 may be slidably attached on respective tracks, rails, or other support structures, and the first actuator 220 and the second actuator 222 may respectively cause the first feed element 104 and the second feed element 106 to be moved laterally along the support structures. That is, the controller 120 may control the first actuator 220 and the second actuator 222 to cause the first actuator 220 and the second actuator 222 to be activated in either of two directions to cause the first feed element 104 and the second feed element 106 to be moved as discussed herein.

Figure 3:
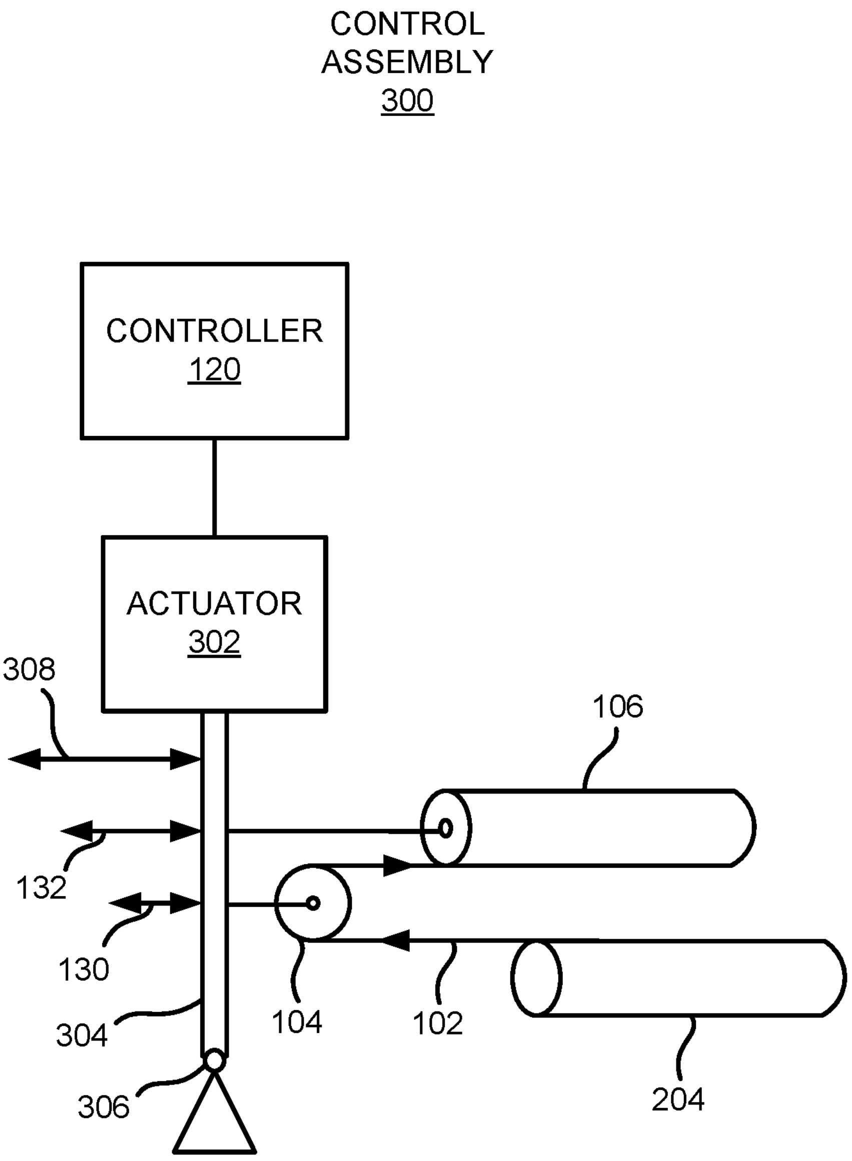
FIG. 3 shows a diagram of an example control assembly that may control movement of the first feed element and the second feed element via an actuator.

Turning now to FIG. 3, there is shown a diagram of an example control assembly 300 that may control movement of the first feed element 104 and the second feed element 106 via an actuator 302. As shown, in addition to the controller 120, the control assembly 300 may include a lever 304 to which the first feed element 104 and the second feed element 106 may be connected at different sections of the lever 304. For instance, the first feed element 104 and the second feed element 106 may be connected to the lever 304 at different heights of the lever 304. The lever 304 may also be attached to a fulcrum 306 about which the lever 304 may rotate. According to examples, the first feed element 104 and the second feed element 106 may be positioned at respective heights along the lever 304 with respect to the fulcrum 306 such that movement of the lever 304 a certain distance 308 may cause the second feed element 106 to move the second distance 132 and the first feed element 104 to move the first distance 130.

As shown, the controller 120 may control the actuator 302 to move the lever 304 the certain distance 308. The certain distance 308 may correspond to the distances that the second feed element 106 and the first feed element 104 are to be moved to compensate for a determined shift in the position of the web 102 with respect to the intended position 112 as discussed herein. The connections of the first feed element 104 and the second feed element 106 to the lever 304 may enable the movement of the lever 304 to cause the first feed element 104 and the second feed element 105 to move concurrently and at different rates with respect to each other.

Figure 4:
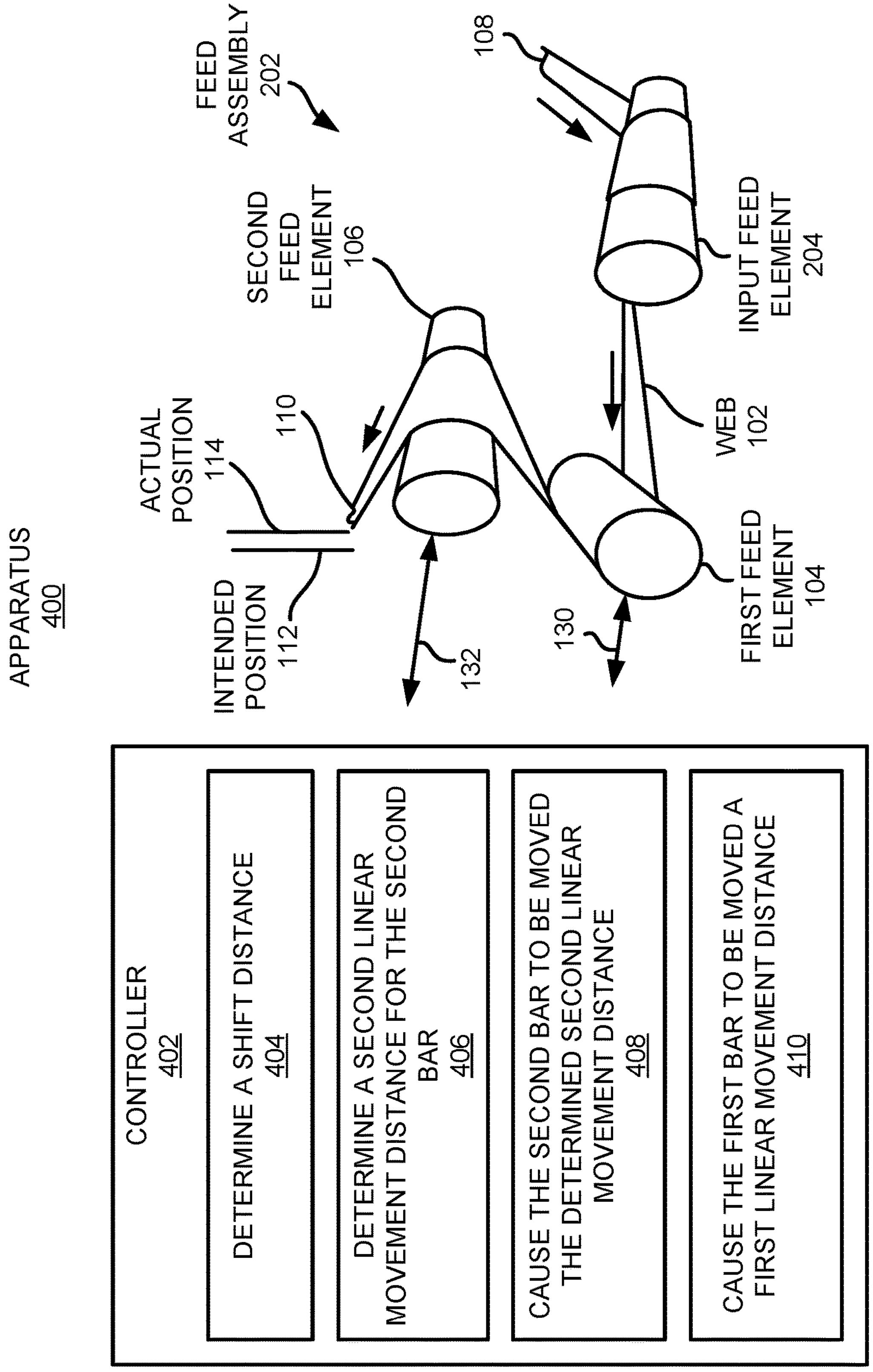
FIG. 4 shows a diagram of an example apparatus that may compensate for a shift in a position of a web being fed across an input feed element, a first feed element, and a second feed element.

Reference is now made to FIG. 4, which shows a diagram of an example apparatus 400 that may compensate for a shift in a position of a web 102 being fed across an input feed element 204, a first feed element 104, and a second feed element 106. It should be understood that the apparatus 400 depicted in FIG. 4 may include additional components and that some of the components described herein may be removed and/or modified without departing from the scope of the apparatus 400 disclosed herein.

As shown in FIG. 4, the apparatus 400 may include a feed assembly 202 that may include the input feed element 204, the first feed element 104, the second feed element 106, and a controller 402. The apparatus 400 shown in FIG. 4 may thus include many of the same components as those of the apparatuses 100 and 200 depicted in FIGS. 1 and 2. As such, the common components are not described again with respect to the apparatus 400 as the descriptions of the common components may also be applicable to the components as depicted in FIG. 4.

The apparatus 400 may include a controller 402 that may compensate for a shift in a position of the web 102 being outputted from the feed assembly 202. The controller 402, however, may compensate for the shift in an alternate manner than the manner discussed above with respect to the controller 120. The controller 400 may be an integrated circuit, such as an application-specific integrated circuit (ASIC). In these examples, instructions 404-410 may be programmed into the integrated circuit. In other examples, the controller 402 may operate with firmware (i.e., machine-readable instructions) stored in a memory. In these examples, the controller 402 may be a microprocessor, a CPU, or the like. In these examples, the instructions 404-410 may be firmware and/or software that the controller 402 may execute as discussed in detail herein.

The controller 402 may determine (instruction 404) a shift distance at which the web 102 exiting the second feed element 106 (and/or the feed assembly 202) has shifted from an intended feed path (which may be equivalent to the intended position 112). The controller 402 may determine the shift distance based on a difference between a detected position 114 of the web 102 and the intended feed path (e.g., intended position 112) of the web 102.

The controller 402 may also determine (instruction 406) a second linear movement distance 132 for the second feed element 106 based on the determined shift distance. The controller 402 may determine the second linear movement distance 132 to be a distance that may compensate for the determined shift distance. In other words, the controller 402 may determine the second linear movement distance 132 to be a distance that brings the web 102 to the intended feed path, e.g., the intended position 112.

The controller 402 may cause (instruction 408) the second feed element 106 to be moved the determined second linear distance 132. That is, the controller 402 may cause an actuator 222, 302 to move the second feed element 106 the determined second linear distance 132. In addition, the controller 404 may cause (instruction 410) the first feed element 104 to be moved a first linear movement distance 130, in which the first linear movement distance 130 may differ from the second linear movement distance 132. As discussed above, the first linear movement distance 130 may be based on, e.g., may relate to the first linear movement distance 132. By way of example, the second linear movement distance 132 may be twice the length of the first linear movement distance 130.

According to examples, the controller 402 may cause the first feed element 104 to be moved the first linear movement distance 130 concurrently with the second linear movement distance 132 of the second feed element 106. That is, for instance, the controller 402 may cause the first feed element 104 to be moved at half the speed at which the second feed element 106 is moved such that the first feed element 104 may reach the first linear movement distance 130 concurrently with the second feed element 106 reaching the second linear movement distance 132. By way of example, the first feed element 104 and the second feed element 106 may be connected to a lever 304 as shown in FIG. 3.

Figure 5:
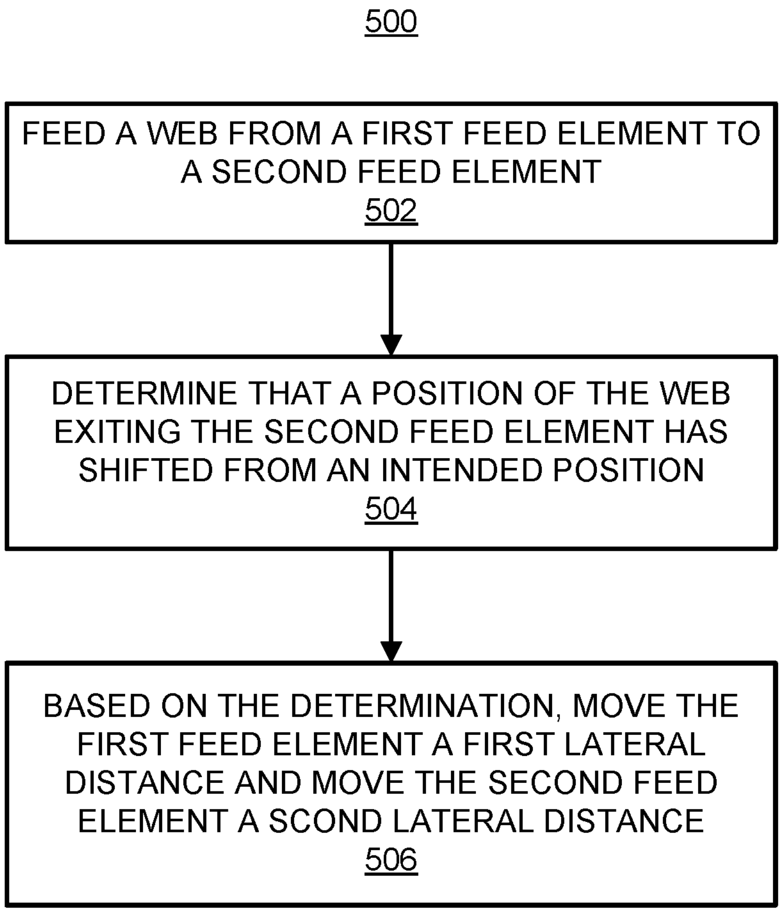
FIG. 5 depicts an example method for compensating for a shift in a position of a web being fed across a first feed element and a second feed element.

Various manners in which the apparatuses 100-400 may be implemented are discussed in greater detail with respect to the method 500 depicted in FIG. 5. Particularly, FIG. 5 depicts an example method 500 for compensating for a shift in a position of a web 102 being fed across a first feed element 104 and a second feed element 106. It should be apparent to those of ordinary skill in the art that the method 500 may represent a generalized illustration and that other operations may be added or existing operations may be removed, modified, or rearranged without departing from a scope of the method 500.

The description of the method 500 is made with reference to the apparatuses 100-400 illustrated in FIGS. 1-4 for purposes of illustration. It should be understood that apparatuses having other configurations may be implemented to perform the method 500 without departing from a scope of the method 500.

At block 502, a web 102 may be fed from the first feed element 104 to the second feed element 106. The web 102 may also be fed from the second feed element 106 and out of a feed assembly 202 including the first feed element 104 and the second feed element 106. For instance, the second feed element 106 may be angled with respect to the first feed element 104 and the web 102 may be fed across the first feed element 104 and the second feed element 106 to change a direction at which the web 102 exits the second feed element 106 with respect to a direction in which the web 102 is fed to the first feed element 104.

At block 504, the controller 120, 402 may determine that a position of the web 102 exiting the second feed element 106, e.g., out of the feed assembly 202, has shifted from an intended position 112. For instance, a detector 210 may detect the actual position 114 of the web 102 exiting the feed assembly 202 and the controller 120, 402 may determine that the web 102 has shifted from the detected actual position 114.

At block 506, based on the determination that the position of the web has shifted, the first feed element 104 may be moved a first lateral distance 130 and the second feed element 106 may be moved a second lateral distance 132. According to examples, the shift distance corresponding to the shift of the web 102 from the intended position 112 may be determined and the second lateral distance 132 may be equivalent to the determined shift distance. In addition, the first lateral distance 130 may be half the second lateral distance 132. As discussed herein, the first feed element 104 may be moved at a different rate than the second feed element 106, e.g., at half the speed. The movement of the first feed element 104 and the second feed element 106 at the relative speeds may be accomplished through movement of a lever to which the first feed element 104 and the second feed element 106 may be attached at various heights as discussed above with respect to FIG. 3.

Some or all of the operations set forth in the method 500 may be contained as utilities, programs, or subprograms, in any desired computer accessible medium. In addition, some or all of the operations set forth in the method 500 may be embodied by computer programs, which may exist in a variety of forms both active and inactive. For example, they may exist as machine readable instructions, including source code, object code, executable code or other formats. Any of the above may be embodied on a non-transitory computer readable storage medium. Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure. For instance, although particular reference is made to a mixture of a first build material powder and a second build material powder, it should be understood features of the present disclosure may be directed to mixtures of more than two build material powders.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
- a first feed element;
- a second feed element, wherein a web is to be fed to the first feed element and from the first feed element to the second feed element;
- a first actuator to move the first feed element;
- a second actuator to move the second feed element, wherein the second actuator is separate from the first actuator;
- a detector to detect a position of the web; and
- a controller to:
  - receive a detected position of the web from the detector;
  - determine whether the web exiting the second feed element is shifted from an intended position based on the detected position of the web; and
  - based on a determination that the web is shifted from the intended position, cause the first actuator to move the first feed element laterally a first distance and the second actuator to move the second feed element laterally a second distance different from the first distance to compensate for the shift in the web exiting the second feed element, wherein the second feed element is at a fixed angular position relative to the first feed element, wherein the first actuator is to move the first feed element laterally at a first rate and the second actuator is to move the second feed element laterally at a second rate different from the first rate, so that the first feed element reaches the first distance concurrently with the second feed element reaching the second distance.

2. The apparatus of claim 1, wherein
- the second distance depends on the first distance, and
- the shift in the web is compensated based on a combination of the lateral movement of the first feed element by the first distance and the lateral movement of the second feed element by the second distance.

3. The apparatus of claim 1, wherein the controller is further to determine a shift distance corresponding to the shift in the web exiting the second feed element and wherein the second distance is equal to the shift distance.

4. The apparatus of claim 1, further comprising:

an input feed element, wherein the web is to be fed to the input feed element and from the input feed element to the first feed element, and wherein the input feed element extends at a common angle as and is parallel to the second feed element.

5. The apparatus of claim 1, wherein:

the web has a predetermined length through the apparatus before the first feed element and second feed element are moved by the first distance and the second distance, respectively, and the first distance and the second distance correspond to values which substantially maintain the predetermined length of the web through the apparatus after the first feed element and second feed element are moved by the first distance and the second distance, respectively.

6. The apparatus of claim 1, wherein: the web has a predetermined tension through the apparatus before the first feed element and second feed element are moved, and the first rate and the second rate correspond to values which substantially maintain the predetermined tension through the apparatus.

7. The apparatus of claim 1, wherein the second feed element is at a fixed angle relative to the first feed element regardless of whether the web undergoes lateral or axial displacement.

8. A method comprising:

feeding a web from a first feed element to a second feed element, wherein the first feed element is connected at a first distance from a pivot point and at a first height of a lever and the second feed element is connected at a second distance from the pivot point and at a second height of the lever different from the first height of the lever;

determining that a position of the web exiting the second feed element has shifted from an intended position; and based on the determination that the position of the web has shifted, causing an actuator to move the lever about the pivot point of the lever to move the first feed element a first lateral distance and a first rate and move the second feed element a second lateral distance different from the first lateral distance and a second rate, wherein the first feed element is to move the first lateral distance concurrently with the second feed element moving the second lateral distance, respectively.

9. The method of claim 8, further comprising:

determining a shift distance corresponding to the shift of the web from the intended position; and wherein the second lateral distance is equivalent to the determined shift distance.

10. The method of claim 8, wherein the first distance from the pivot point and the second distance from the pivot point cause the first lateral distance to be half the second lateral distance.

11. The method of claim 8, wherein moving the first feed element further comprises moving the first feed element at a first rate and moving the second feed element further comprises moving the second feed element at a second rate, wherein the first rate differs from the second rate.

12. An apparatus comprising:

an input feed element to receive a web from a first direction and to turn the web to a second direction;

a first feed element to receive the web from the input feed element;

a second feed element to receive the web from the first feed element, wherein the second feed element extends at a common angle as and is parallel to the input feed element; and a first actuator to move the first feed element;

a second actuator to move the second feed element, wherein the second actuator is separate from the first actuator;

a detector to detect a position of the web;

a controller to:

determine a shift distance at which the web exiting the second feed element has shifted from an intended feed path;

determine a second linear movement distance for the second feed element based on the determined shift distance;

cause the second actuator to move the second feed element the determined second linear movement distance; and cause the first actuator to move the first feed element a first linear movement distance, the first linear movement distance differing from the second linear movement distance, wherein the second feed element is at a fixed angle relative to the first feed element and wherein the first actuator is to move the first feed element at a different rate at which the second actuator is to move the second feed element, so that the first feed element reaches the first linear movement distance concurrently with the second feed element reaching the second linear movement distance.

* * * * *